TELEVISION TRANSMITTER SYSTEM EMPLOYING COMPONENTS IN PARALLEL

Filed May 18, 1955

INVENTORS
OWEN O. FIET AND
THOMAS U. FOLEY
BY
Charles H. Brown
ATTORNEY 2,864,082

TELEVISION TRANSMITTER SYSTEM EMPLOYING COMPONENTS IN PARALLEL

Owen O. Fiet, Oaklyn, and Thomas U. Foley, Magnolia, N. J., assignors to Radio Corporation of America, a corporation of Delaware Application May 18, 1955, Serial No. 509,197

14 Claims. (Cl. 343—207)

This invention relates to systems including similar complex circuits coupled in parallel to provide increased power handling capacity and improved impedance characteristics, and more particularly to the parallel operation of television broadcast transmitter components.

A television broadcast transmitting station normally includes a visual transmitter, an aural transmitter, and a common antenna from which both visual and aural signals are radiated. The antenna may include separate radiating elements for the visual and aural signals, or it may use the same radiating elements for both signals. If the same radiating elements are used for both signals, a diplexer is employed to combine the visual and aural signals before application to the radiating elements. Filter means provide a vestigial sideband visual signal as required by the present television broadcast standards in the United States. The functions of sideband filtering and diplexing may both be accomplished in a combination filter-diplexer called a filterplexer. The term "filterplexer," as just defined and as used in the present specification, is in rather common usage among those employees of applicant's assignee who are skilled in the art to which this invention pertains.

There is a need for broadcast transmitters of higher power capabilities than can be provided by known or existing transmitters. It is therefore a general object of this invention to provide an improved system wherein selected portions of two visual and two aural transmitters are operated in parallel to deliver twice the power which one is capable of delivering.

It is another object to provide an improved system of visual amplifiers, aural amplifiers, filters and diplexers of given power capability whereby the system can handle twice as much power as the individual units.

It is another object to provide an improved system for combining the outputs of two visual transmitters and two aural transmitters.

It is a further object to provide an improved parallel arrangement of similar circuits having complex impedance characteristics whereby the impedance characteristic at the common input terminal is improved and the standing wave ratio is reduced.

It is a still further object to provide an improved parallel system whereby less expensive units may be employed to provide performance equal to that previously attainable from more elaborate and more precisely adjusted units.

In one aspect, the invention comprises a television broadcasting system wherein the output of the low power portion of an existing visual transmitter is divided into two parallel paths, and the output of the low power portion of an existing aural transmitter is divided into two parallel paths. Power amplifiers are inserted in the parallel paths to double the output power available. The output of one visual path and the output of one aural path are combined in a diplexer or filterplexer, and the output of the other visual path and the output of the other aural path are combined in another diplexer or filterplexer. By using two diplexers in parallel, the power handling capacity is double that of one diplexer. The outputs of each diplexer include visual and aural signals. The outputs are combined and applied to an antenna.

According to a feature of the invention, the amplifiers, diplexers and filters in the parallel paths are staggered so as to present an improved input impedance characteristic, or stated another way, to provide a reduced input standing wave ratio. Broadly, the invention includes the novel connection of a plurality of devices having similar complex impedance characteristics in parallel paths of equal length, the devices being located at electrical distances from the input junction differing by substantially a half wavelength divided by the number of paths.

The invention is described in greater detail in connection with the appended drawing, wherein.

Figures 1, 2, 3, 4, 5, 6:
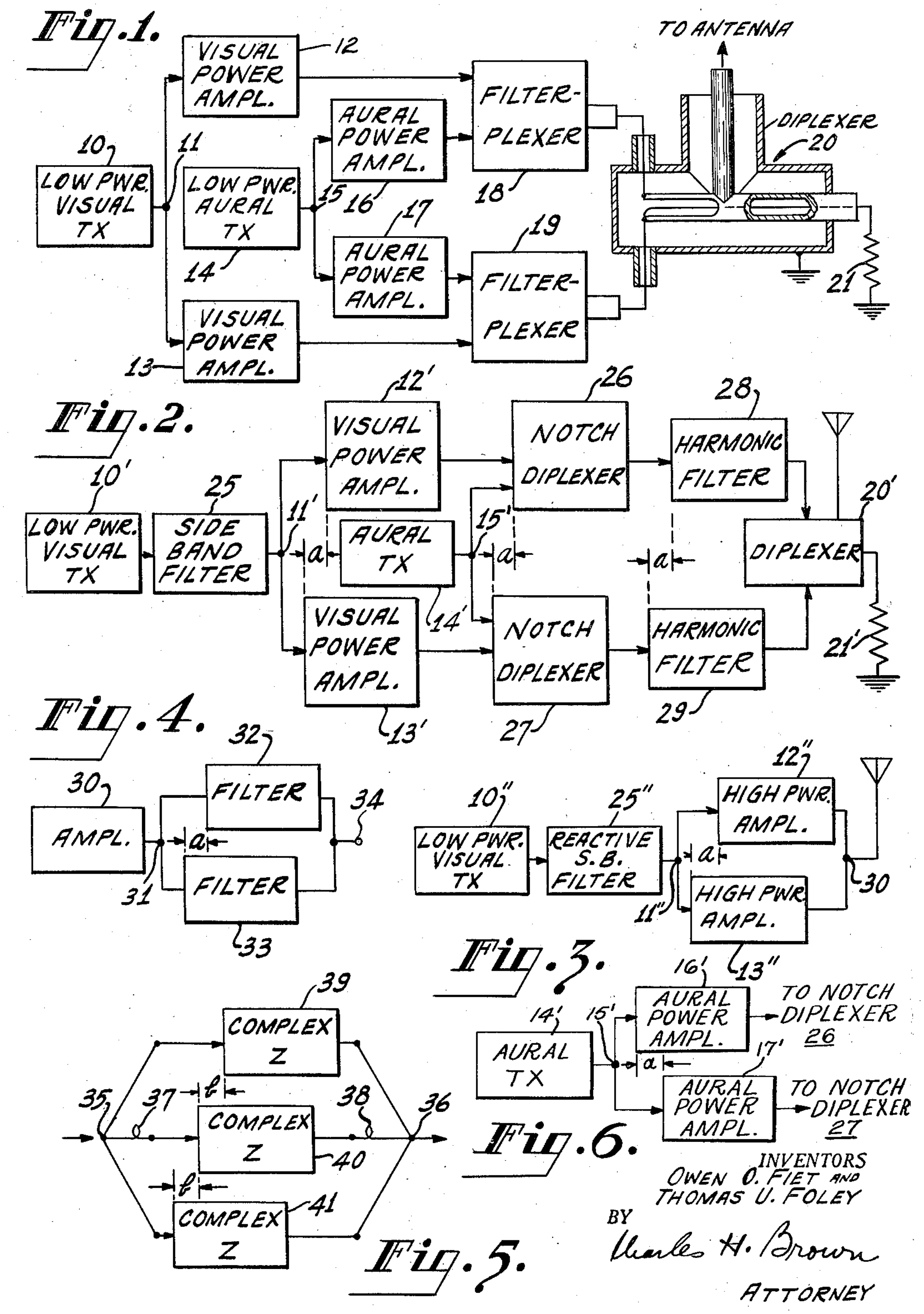
Figure 1 is a diagram of a television transmitter including components connected in parallel, according to the teachings of this invention.
Figure 2 is a block diagram of a television transmitter including staggered components in parallel paths to provide improved impedance characteristics.
Figure 3 is a block diagram of the visual portion of a television transmitter of the type wherein the visual and aural signals are applied to different radiating elements on the antenna.
Figure 4 is a block diagram showing two filters connected in parallel paths of equal length.
Figure 5 is a generalized block diagram broadly illustrative of an aspect of the invention.
Figure 6 is a partial block diagram illustrating the addition of aural amplifiers to the system of Figure 2.

Figure 1 illustrates a high power television transmitter including a low power visual (picture) transmitter having its output divided at the junction point 11 into two parallel paths including two visual power amplifiers 12 and 13. A low power aural (sound) transmitter 14 has its output divided at junction point 15 into two parallel paths including aural power amplifiers 16 and 17. The junctions 11 and 15 may be standard coaxial line T junctions. The low power visual and aural transmitters 10 and 14 may, for example, constitute the type TTU-1B low power television transmitter manufactured and sold by applicants' assignee. The visual power amplifiers 12 and 13 and the aural power amplifiers 16 and 17 may be of the type included in a 12 kilowatt television transmitter. The outputs of the visual power amplifiers 12 and 13 and the outputs of the aural power amplifiers 16 and 17 are applied to the inputs of the respective filterplexers 18 and 19. The filterplexers 18 and 19 may be of the type included in the type TTU-12A transmitter of applicants' assignee, and described in patent application, Serial No. 289,483, filed on May 23, 1952, by Owen O. Fiet on a "Diplexer and Sideband Filter Arrangement," now Patent No. 2,763,839, dated September 18, 1956, assigned to the assignee of this present application. The term filterplexer is applied to a combination diplexer and sideband filter. The filterplexers 18 and 19 may be constructed by adding sideband filter resonators to the two arms of the notch diplexer shown in Patent No. 2,661,424 issued on December 1, 1953, to I. E. Goldstein. The filterplexers 18 and 19 are each four terminal devices with one of the terminals connected within the box to a terminating or balancing resistor (not shown). The outputs of the filterplexers 18 and 19 are applied to a diplexer 20 which may be a split balun bridge diplexer of the general type described in U. S. Patent No. 2,454,907 issued on November 30, 1948, to G. H. Brown. One output of the diplexer 20 is applied to an antenna (not shown), and the other output of the diplexer is applied to an absorbing resistor 21 which dissipates the unbalance currents.

The electrical lengths of the two parallel paths from the junction point 11 to the inputs of the diplexer 20 are equal, and the electrical lengths of the two parallel paths from the junction point 15 to the inputs of the diplexer 20 are equal. It will, of course, be understood that the length of a transmission line may be increased or decreased by any multiple of a half wavelength at a given frequency without changing the electrical length of the line at that frequency.

It will be noted from Figure 1 that the outputs of the visual power amplifier 12 and the aural power amplifier 16 are applied to the inputs of the filterplexer 18, and that the outputs of the visual power amplifier 13 and the aural power amplifier 17 are applied to the inputs of filterplexer 19. By this arrangement, two filterplexers 18 and 19 are employed in parallel to handle twice as much power as each filterplexer alone is capable of handling. According to the system of Figure 1, visual power amplifiers, aural power amplifiers and filterplexers of given power handling capacity are coupled together in such a way as to provide double the given power handling capacity.

Figure 2 is a block diagram of a television transmitter wherein the circuit components corresponding to those appearing in Figure 1 are given the same reference numerals with prime designations added. The system of Figure 2 differs from that of Figure 1 by including a sideband filter 25 interposed between the output of the low power visual transmitter 10′ and the junction point 11′, by utilizing notch diplexers 26 and 27 in place of filterplexers 18 and 19, and by including harmonic filters 28 and 29 between the respective notch diplexers 26 and 27 and the diplexer 20′. The notch diplexers 26 and 27 may be of the type described in U. S. Patent No. 2,661,424 issued on December 1, 1953, to I. E. Goldstein. A notch diplexer includes a sharply tuned filter element which rejects component frequencies of the visual signal falling in the relatively narrow range of the aural signal. The amplitude vs. frequency characteristic of the visual signal is thus "notched," and the two signals are combined in the diplexer so that the aural signal falls within the notch in the visual signal.

A filterplexer includes means for sideband filtering of the visual signal, and a notch diplexer does not include means for sideband filtering. According to the system of Figure 2, sideband filtering of the visual signal is accomplished by means of a separate sideband filter 25 disposed at the output of the low power visual transmitter 10′. The sideband filter 25 may be of the type described in U. S. patent application Serial No. 170,915, filed on June 28, 1950, by George H. Brown and entitled "Vestigial Sideband Filter," now Patent No. 2,713,152, issued on July 12, 1955. The described filter is characterized in having essentially zero input reactance over the desired frequency range. On the other hand, a simpler filter constituted by half of the described filter may be employed. This simpler filter may be termed a reactive sideband filter because the input reactance is not zero over the frequency range. Harmonic filters 28 and 29 may be of any suitable type capable of rejecting unwanted frequencies which are harmonics of the radio frequency visual and aural signals, while passing the visual and aural signals themselves with as little attenuation as possible.

The two parallel paths from the junction point 11′ to the diplexer 20′ are of equal electrical length, and the two parallel paths from the junction point 15′ to the diplexer 20′ are of equal length. The visual power amplifiers 12′ and 13′ are positioned in the respective parallel paths at distances from the junction point 11′ which differ by an amount *a*. Similarly, the notch diplexer 26 and the notch diplexer 27 are located at distances differing in length *a* from the junction point 11′, and also from the junction point 15′ at the output of the aural transmitter 14′. As shown in Fig. 6, aural amplifiers 16′ and 17′ may be inserted in the leads between the point 15′ and the notch diplexers 26 and 27, the aural amplifiers being staggered from point 15′ in the same fashion as the visual amplifiers 12′ and 13′ are from point 11′. The harmonic filters 28 and 29 are located at distances differing by the amount *a* from junction points 11′ and 15′. The distances *a* are equal to substantially a quarter-wavelength at the operating frequency. A television signal, according to the standards in the United States, includes a range of frequencies extending over a band somewhat less than the six megacycles allotted to each channel. As used herein, the term "operating frequency" means a frequency within the range of frequencies constituting the signal. It will be understood by those skilled in the art that the advantages obtained according to the invention are not limited to a distance *a* equal to exactly a quarter-wavelength at a precise frequency such as the midband frequency of the signal.

Visual power amplifiers 12′ and 13′ are class B amplifiers which present an input impedance which varies with the amplitude of the input signal and varies according to the frequency of the input signal. The input impedance of each amplifier is necessarily a complex impedance, that is, it has a reactive component and is not a pure resistance. Consequently, portions of the energy applied to the inputs of the power amplifiers are reflected so that standing waves exist on the input lines. The standing wave ratio encountered in practice may be on the order of 1.2 at the input of each of the visual power amplifiers 12′ and 13′. However, by staggering the visual power amplifiers by an amount *a* equal to substantially a quarter-wavelength, the standing wave ratio at the junction point 11′ is reduced to a figure on the order of 1.01. This is a considerably improved standing wave ratio, indicative of a much better coupling of energy from the sideband filter 25 to the visual power amplifiers and a consequent improvement in the efficiency of operation. The staggering of the amplifiers also improves the frequency bandwidth characteristics of the system. A television visual signal occupies a range of frequencies extending thru several megacycles, and the ability of a television transmitter to handle a wide band of frequencies without distortion is of great importance. Another advantage of the staggering of the amplifiers is that a relatively simple sideband filter 25 may be employed. The sideband filter 25 may be a reactive filter, and need not be the more complex type known as a constant impedance vestigial sideband filter.

The similar staggering of the notch diplexers 26 and 27 and the harmonic filters 28 and 29 reduces the standing wave ratio at both the junction point 15′ and the junction point 11′, compared with the standing wave ratio at the input of the individual units, and compared with the standing wave ratio at the junctions when the units in the parallel paths are not staggered. As a result, the coupling of energy from the aural and visual transmitters to the diplexer 20′ is greatly improved.

In the system of Figure 1, the amplifiers and filterplexers may be staggered after the fashion illustrated in Figure 2. However, the use of separate sideband filter 25 and notch diplexers 26, 27 in place of filterplexers 18, 19 results in a considerable economic advantage, and is possible only because of the staggered arrangement.

Figure 3 shows a visual transmitter used with an antenna of the type not requiring the application of both visual and aural signals to the same radiating elements. Figure 3 includes units similar to those of Figure 2 and bearing the same numerals, with double prime designations added. The outputs of the parallel high power amplifiers 12″ and 13″ may be combined in a simple coaxial line T 30, rather than in a diplexer. The amplifiers are staggered by an amount *a* equal to substantially a quarter-wavelength of the operating frequency to provide the advantages described in connection with the transmitter of Figure 2. Other radiating elements of the same antenna structure may be fed from a similar arrangement of a low power aural transmitter and parallel high power aural amplifiers, but not including a sideband filter.

Figure 4 illustrates an amplifier 30 to which an input signal is supplied, coupled thru a junction 31 to staggered filters 32 and 33 in equal parallel paths terminating at the output terminal 34, from which the amplified and filtered output is derived for application to any suitable signal utilization circuit. The filters 32 and 33 are staggered to improve the coupling of energy from the amplifier 30, and to utilize two filters to provide the power handling capacity twice that of either one. Figure 4 illustrates generally that improved coupling can be obtained from an amplifier to parallel staggered filters, as well as from a filter to parallel staggered amplifiers (Figure 3).

Figure 5 is a generalized diagram showing an input terminal 35, to which an input signal is applied, connected thru three paths of equal length to an output terminal 36, from which the output signal is derived. Loops 37 and 38 are inserted in the central path to illustrate that the three paths are of the same length. Similar devices 39, 40 and 41 having similar complex input impedances are inserted in the respective paths and are staggered with respect to each other by an amount equal to *b*. Stated another way, the devices are positioned at distances from the input terminal 35 which differ from each other by an amount *b*. The devices 39, 40 and 41 may, for example, be amplifiers, filters or diplexers.

The distances *b* are equal to a half wavelength at the operating frequency divided by the number of parallel paths. With three paths as illustrated in Figure 5, the distance *b* is equal to one-sixth wavelength. By having the complex impedance devices staggered by the distance *b*, the input impedance at the input junction point 35 is considerably improved compared with the input impedance characteristics of the individual devices, and is improved over the results obtainable when the devices are at equal distances from the junction point 35.

What is claimed is:

1. A television transmitting system comprising a low power visual transmitter having an output divided into two parallel paths, a low power aural transmitter having an output divided into two parallel paths, power amplifiers in at least two of said paths, a first diplexer combining the outputs of one visual path and one aural path, a second diplexer combining the outputs of the other visual path and the other aural path, and a third diplexer combining the outputs of said first and second diplexers.

2. A television transmitting system comprising a low power visual transmitter having an output divided into two parallel paths, a low power aural transmitter having an output divided into two parallel paths, power amplifiers in at least two of said paths, a first combination sideband filter and diplexer combining the outputs of one visual path and one aural path, a second combination sideband filter and diplexer combining the outputs of the other visual path and the other aural path, and a diplexer combining the outputs of said first and second combination sideband filters and diplexers.

3. A television transmitting system comprising a low power visual transmitter having an output divided into a set of two parallel paths of equal length, a low power aural transmitter having an output divided into another set of two parallel paths of equal length, power amplifiers in at least one set of parallel paths, said amplifiers being positioned at electrical path distances from the respective low power transmitter differing by substantially a quarter-wavelength at the operating frequency, a first diplexer combining the outputs of one visual path and one aural path, a second diplexer combining the outputs of the other visual path and the other aural path, a third diplexer, and means coupling the outputs of said first and second diplexers to inputs of said third diplexer.

4. The combination as defined in claim 3, wherein said first and second diplexers are positioned at electrical path distances from the visual transmitter differing by substantially a quarter-wavelength at the operating frequency, and also at electrical path distances from the aural transmitter differing by substantially a quarter-wavelength at the operating frequency.

5. A television transmitting system comprising a low power visual transmitter having an output divided into two parallel paths of equal length, a low power aural transmitter having an output divided into two parallel paths of equal length, visual power amplifiers in the parallel paths from the visual transmitter and positioned at electrical path distances from the visual transmitter differing by substantially a quarter-wavelength at the operating frequency, aural power amplifiers in the parallel paths from the aural transmitter and positioned at electrical path distances from the aural transmitter differing by substantially a quarter-wavelength at the operating frequency, a first diplexer in one of the paths from the visual transmitter and one of the paths from the aural transmitter, a second diplexer in the other path from the visual transmitter and the other path from the aural transmitter, a third diplexer, means coupling the output of said first diplexer to an input of said third diplexer, and means coupling the output of said second diplexer to an input of said third diplexer.

6. A television transmitting system comprising a low power visual transmitter, a low power aural transmitter, a first diplexer having two inputs, two parallel visual paths of equal length from the output of said visual transmitter to respective inputs of said diplexer, two parallel aural paths of equal length from the output of said aural transmitter to the respective inputs of said diplexer, visual power amplifiers in respective visual paths, aural power amplifiers in respective aural paths, a second diplexer combining one visual path and one aural path, and a third diplexer combining the other visual path and the other aural path.

7. A television transmitting system as defined in claim 6, wherein said visual power amplifiers are positioned at electrical path distances from the visual transmitter differing by substantially a quarter-wavelength at the operating frequency.

8. A television transmitting system as defined in claim 6, wherein said aural power amplifiers are positioned at electrical path distances from the aural transmitter differing by substantially a quarter-wavelength at the operating frequency.

9. A television transmitting system as defined in claim 6, wherein said second and third diplexers are positioned at electrical path distances from the visual transmitter differing by substantially a quarter-wavelength at the operating frequency and also at electrical path distances from the aural transmitter differing by substantially a quarter-wavelength at the operating frequency.

10. A television transmitting system comprising a low power visual transmitter, a sideband filter having an input coupled to the output of said visual transmitter, an aural transmitter, a first diplexer, two parallel paths of equal length from the output of said sideband filter to the inputs of said first diplexer, two parallel paths of equal length from the output of said aural transmitter to the inputs of said diplexer, a second diplexer combining one path from said sideband filter and one path from said aural transmitter, a third diplexer combining the other path from said sideband filter and the other path from said aural transmitter, and devices having similar complex impedance characteristics in said parallel paths positioned at electrical path distances from said transmitters differing by substantially a quarter-wavelength at the operating frequency.

11. A television transmitting system comprising a low power visual transmitter, a sideband filter having an input coupled to the output of said visual transmitter, an aural transmitter, a first diplexer, two parallel paths of equal length from the output of said sideband filter to the inputs of said diplexer, two parallel paths of equal length from the output of said aural transmitter to the inputs of said diplexer, a second diplexer combining one path from said sideband filter and one path from said aural transmitter, a third diplexer combining the other path from said sideband filter and the other path from said aural transmitter, said second and third diplexers being positioned at electrical path distances from said sideband filter differing by substantially a quarter-wavelength at the operating frequency and at electrical path distances from the aural transmitter differing by substantially a quarter-wavelength at the operating frequency, and devices having similar complex impedance characteristics in said parallel paths positioned at electrical path distances from said sideband filter and said aural transmitters differing by substantially a quarter-wavelength at the operating frequency.

12. A television transmitting system comprising a low power visual transmitter having an output; a sideband filter having an input coupled to the output of said visual transmitter, two visual power amplifiers having their inputs connected in parallel to the output of said sideband filter at electrical path distances differing by substantially a quarter-wavelength at the operating frequency, first and second notch diplexers each having two inputs one of which is connected to a respective one of said visual power amplifiers, an aural transmitter, means coupling the other inputs of said notch diplexers in parallel to the output of said aural transmitter, said notch diplexers being positioned at electrical path distances from the sideband filter differing by substantially a quarter-wavelength at the operating frequency and being positioned at electrical path distances from the aural transmitter differing by substantially a quarter-wavelength at the operating frequency, first and second harmonic filters having inputs coupled to the outputs of respective ones of said first and second notch diplexers at equal electrical path lengths therefrom, and a combining diplexer having two inputs coupled to the outputs of respective ones of said first and second harmonic filters, the parallel path lengths from said sideband filter to said combining diplexer being equal, and the parallel path lengths from said aural transmitter to said combining diplexer being equal.

13. A visual television transmitting system comprising a low power visual transmitter having an output; a single reactive sideband filter having an input coupled to the output of said visual transmitter, a radiating antenna, two parallel signal paths of equal length coupling the single output of said sideband filter to said antenna, and two power amplifiers in said respective parallel paths positioned at electrical path distances from the inputs thereof differing by substantially a quarter-wavelength at the operating frequency.

14. A visual transmitting system comprising a low power visual transmitter having an output; a single reactive sideband filter having an input coupled to the output of said transmitter, an antenna, a plurality of parallel paths of equal length from the single output of said filter to said antenna, and a power amplifier in each of said parallel paths, said power amplifiers being positioned at electrical path distances from said filter differing by a half-wavelength divided by the number of parallel paths.

References Cited in the file of this patent

UNITED STATES PATENTS

| | | |
|---|---|---|
| 2,341,408 | Lindenblad | Feb. 8, 1944 |
| 2,454,907 | Brown | Nov. 30, 1948 |
| 2,511,899 | Brown | June 20, 1950 |
| 2,531,419 | Fox | Nov. 28, 1950 |
| 2,595,680 | Lewis | May 6, 1952 |
| 2,602,887 | Brown | July 8, 1952 |
| 2,763,839 | Fiet | Sept. 18, 1956 |
| 2,795,763 | Tillotson | June 11, 1957 |

FOREIGN PATENTS

| | | |
|---|---|---|
| 155,953 | Australia | Apr. 1, 1954 |